United States Patent
Di Franco et al.

(10) Patent No.: US 10,229,712 B2
(45) Date of Patent: Mar. 12, 2019

(54) METHOD FOR RECORDING A PLURALITY OF AUDIO FILES

(71) Applicant: RECWON S.R.L., Asti (IT)

(72) Inventors: Pietro Di Franco, Isola d'Asti Fraz (IT); Francesco Morana, Palermo (IT)

(73) Assignee: Recwon S.R.L., Asti (IT)

( * ) Notice: Subject to any disclaimer, the term of this patent is extended or adjusted under 35 U.S.C. 154(b) by 20 days.

(21) Appl. No.: 14/890,177

(22) PCT Filed: May 8, 2014

(86) PCT No.: PCT/IB2014/000701
§ 371 (c)(1),
(2) Date: Nov. 10, 2015

(87) PCT Pub. No.: WO2014/181169
PCT Pub. Date: Nov. 13, 2014

(65) Prior Publication Data
US 2016/0093327 A1    Mar. 31, 2016

(30) Foreign Application Priority Data
May 10, 2013   (IT) .............................. TO2013A00376

(51) Int. Cl.
*G11B 20/10* (2006.01)
*G11B 27/031* (2006.01)
*G10L 19/008* (2013.01)

(52) U.S. Cl.
CPC ...... *G11B 20/10527* (2013.01); *G10L 19/008* (2013.01); *G11B 20/10* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2003/0156544 A1* | 8/2003 | Ido ..................... | H04L 12/2602 370/241 |
| 2004/0223553 A1* | 11/2004 | Kumar .................. | H04L 1/0059 375/259 |

(Continued)

FOREIGN PATENT DOCUMENTS

CN          101751983 A       6/2010

OTHER PUBLICATIONS

Unknown: "GarageBand Getting Started", 2007, Apple Inc.
(Continued)

*Primary Examiner* — Hung Q Dang
*Assistant Examiner* — Sunghyoun Park
(74) *Attorney, Agent, or Firm* — Workman Nydegger

(57) ABSTRACT

A method for recording a plurality of audio files, which can be played individually and, at least in pairs, synchronously and which can be modified individually with respect to playing parameters, said method being implemented by means of electronic processing hardware and software means, including: —at least two independent devices originating sound signals, comprising storage means or a microphone input or an in line input; —means for playing audio files, and —software means for playing one or more audio files individually or synchronously, wherein (step 101) at least two independent audio files are acquired in real time and simultaneously, from at least two sound signal sources, and (step 102) they are synchronized one another by means of an encoder that encodes said same files, making them of the same time duration, obtaining at least two audio files of the same length and independent from one another, and said audio files are included in a respective container file, which is provided with related identification and operating parameters, and wherein (step 103) said at least two audio files are played, by means of said means for playing said synchro- (Continued)

nized audio files, simultaneously or independently with respect to one another, according to the instructions present in said container file provided with parameters.

10 Claims, 1 Drawing Sheet

(52) U.S. Cl.
CPC .. *G11B 27/031* (2013.01); *G11B 2020/10592* (2013.01); *G11B 2020/10953* (2013.01)

(56) References Cited

U.S. PATENT DOCUMENTS

| | | | | |
|---|---|---|---|---|
| 2005/0169483 A1* | 8/2005 | Malvar | ............... | H04R 3/005 381/58 |
| 2006/0291805 A1* | 12/2006 | Mita | ............... | G11B 20/10 386/247 |
| 2008/0190271 A1* | 8/2008 | Taub | ............... | G10H 1/0058 84/645 |
| 2011/0061108 A1* | 3/2011 | Arrasvuori | ............... | G06F 21/10 726/27 |
| 2011/0146476 A1* | 6/2011 | Zimmerman | ............... | G09B 15/00 84/470 R |
| 2012/0324054 A1* | 12/2012 | Gibbon | ............... | H04L 65/1069 709/218 |
| 2013/0307921 A1* | 11/2013 | Mitchell | ............... | H04N 7/147 348/14.08 |
| 2014/0248857 A1* | 9/2014 | Huang | ............... | H04W 4/12 455/412.1 |
| 2015/0194144 A1* | 7/2015 | Park | ............... | G10K 11/175 381/73.1 |

OTHER PUBLICATIONS

Unknown: "Adobe Audition 3 User Guide", 2007, Adobe Systems Incorporated.
Aikan et al.: "Windows Multitrack Recorders Pro Audio Comes Home", Keyboard, 1997, pp. 29-55.

* cited by examiner

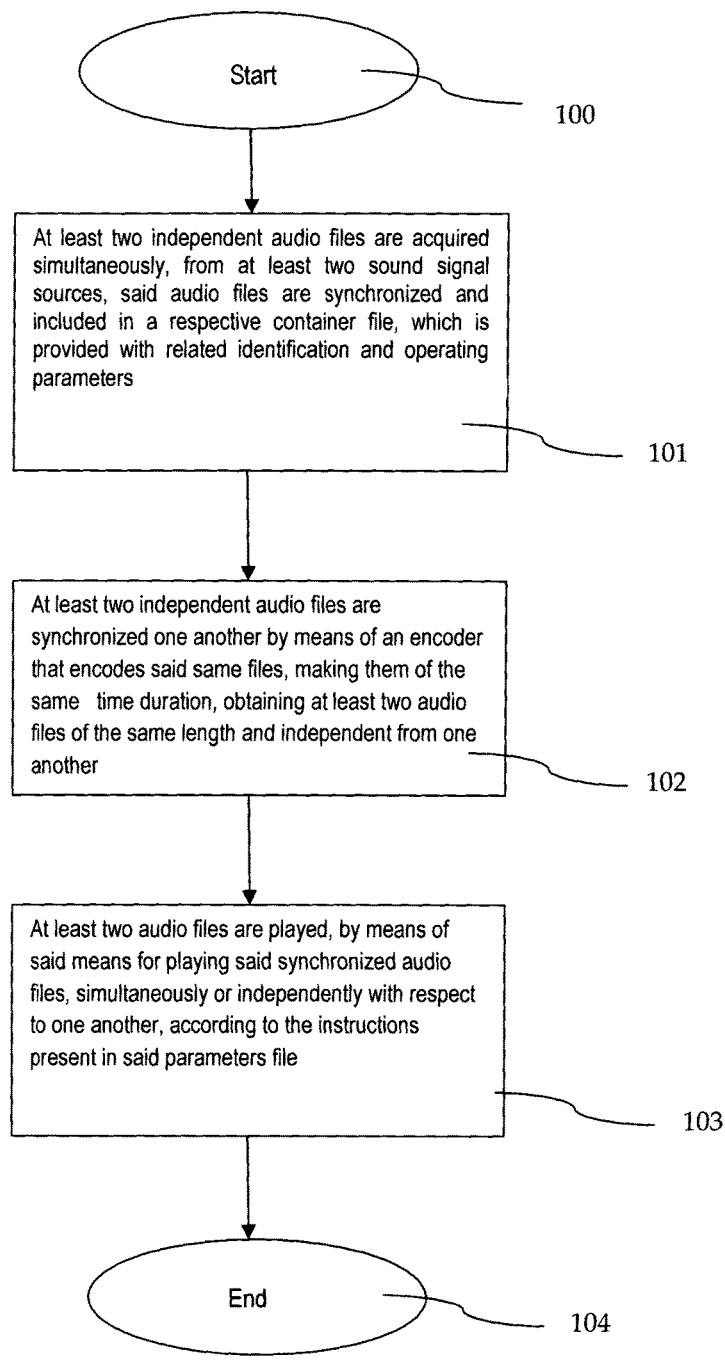

METHOD FOR RECORDING A PLURALITY OF AUDIO FILES

This is the national stage of International Application PCT/IB2014/000701, filed May 8, 2014.

The present invention relates to a method for recording a plurality of audio files.

More in particular, said method according to the present invention is used for recording a plurality of audio files, which can be played individually and at least in pairs, synchronously and which can be modified individually with respect to playing parameters.

Several methods are currently known in the prior art for the acquisition of a plurality of audio files and subsequent playback of a multitrack audio file containing said previously acquired files.

However, said known methods allow the user a minimum level of interaction with said multitrack audio file, mostly limited to only the possibility of influencing the playback volume or, if there is also a video track, of adjusting the reproduction speed of the same.

In the prior art there have been several attempts aimed to implement the possibility of interaction by the user with multitrack audio and/or video files, or to implement the same with more information.

In the above prospect of greater interactivity with said multitrack audio and/or video file, method are currently known in the art which, during the progress of a song, also include the simultaneous and synchronized scrolling of the text of the song itself on a screen, for example as described in No. CN101751983.

The above document No. CN101751983 discloses a method and relative means for playing a song by providing a simultaneous accompaniment effect, as well as displaying at the same time the text of the same, in a synchronous manner. More specifically, said method is implemented using an advanced audio technology, a system of the multitrack "surround" type and an advanced encoding/decoding technology for implementing the audio file accompanying the songs, and text editing software is also used in order to change the lyrics of the songs on the basis of said audio accompaniment file.

The system for playing the audio file relative to the song and the playback system of said audio accompaniment file are independent and without mutual interference, and respectively provided with a "switch" system for the independent control, such systems being able to be activated for the independent playback, i.e. to be opened simultaneously for obtaining simultaneous playback.

Further known methods allow the user to perform a "split" operation on the voice track (or tracks) with respect to the relative musical base.

On the other hand, the acquisition of a plurality of audio tracks is possible by the most common audio recording and editing programs and means. However, even said known recording and editing programs and means, once the final multitrack audio file has been finalized, do not allow the independent management of said tracks contained therein.

Based on the foregoing, it is therefore clear that said known methods and means do not allow the user to acquire and subsequently playback the tracks contained in an audio and/or video file, in a fully independent manner with respect to each other.

In addition, on the basis of said known methods and means, it is not possible to simultaneously display and/or playback one or more audio and/or video files at the same time as one or more files of different format (for example, a file format .PDF, .TXT or the like).

Likewise, said known methods and means often require significant hardware resources to acquire the single tracks, the hardware means already included therefore being not sufficient.

On the other hand, said known methods and means mostly require dedicated platforms, thus reducing the application possibilities relating to the presence of the same.

From the above it is therefore clear that none of said known methods allows the user to manage the tracks contained in said final multitrack file in a completely independent manner.

Starting from the notion of the above drawbacks, the present invention aims to solve them.

An object of the present invention is to provide a method for recording a plurality of audio files which allows the user to operate independently in the acquisition of the files and on audio files acquired.

It is also an object of the present invention to provide a method as indicated which allows the simultaneous display and/or playback of one or more audio and/or video files with one or more files of different format (for example, a file format .PDF, .TXT or the like).

In addition, it is further object of the present invention to provide a method as mentioned, which requires, for the purposes of its implementation, relatively simple hardware and software means, easily included in, respectively implementable by, a common electronic computer.

On the other hand, it is an object of the present invention to provide a method as mentioned, which is implementable, by simple dedicated software, on any platform.

In view of such objects, the present invention provides a method for recording a plurality of audio files the essential feature whereof is the subject-matter of claim 1. Further advantageous features of the invention are described in the dependent claims.

The above claims are intended as integrally reported herein.

The present invention will become more apparent from the detailed description which follows, with reference to the drawing attached thereto, which is purely exemplary and therefore non-limiting, in which:

the single FIGURE is a functional flow-chart relating to an exemplary embodiment of the method for recording a plurality of audio files according to the present invention.

Reference will firstly be made to the above drawing FIGURE, which is a functional flow chart relating to an exemplary implementation of the method for recording a plurality of audio files, which can be played individually and, at least in pairs, synchronously and which can be modified individually with respect to playing parameters, according to the present invention.

Said method according to the present invention is implemented by hardware and software electronic processing means, including:

at least two independent devices originating sound signals, comprising storage means or a microphone input or an inline input;

means for playing audio files, and software means for playing one or more audio files individually or synchronously.

Said method comprises at least the following steps (see FIGURE)

step 100: Start—said hardware and software means are activated;

step 101: at least two independent audio files are acquired simultaneously, from at least two sound signal sources, and step 102: they are synchronized one another by means of an encoder that encodes said same files, making them of the same time duration, obtaining at least two audio files of the same length and independent from one another, and said audio files are included in a respective container file, which is provided with related identification and operating parameters, step 103: said at least two audio files are played, by means of said means for playing said synchronized audio files, simultaneously or independently with respect to one another, according to the instructions present in said parameters file;

step 104: End.

Advantageously, said encoding is performed by sampling.

It is however understood that the execution of said encoding by different processes equally falls within the present invention.

Said container file is marked by a relative extension, which allows the reference operating system to distinguish, uniquely, its contents, as well as open it with the respective application.

The acquisition (101) of said audio files may take place by direct acquisition in real time, by appropriate hardware and software recording means, or it can take place by recovering one or more audio files already present on a hardware storage means.

More in particular, hardware recording means may include at least one microphone input, or one or more in line inputs.

Said hardware, software means, respectively, are known in the art and as such are not further described herein.

Since as a result of said synchronization by encoding (102), said audio files have the same length, it is possible to proceed with the relative playback (103) independently, without causing any dysphonia or other undesired acoustical effects.

Said audio file hardware playback means are also known and not further described.

Advantageously, said at least two audio files acquired analogically by means of a microphone input or an in line input are converted into digital signals by means of encoding of PCM>44100 hz 16 bit stereo type, obtaining respective files in .WAV format.

In this case, synchronization of one of said at least two audio files is performed by means of encoding of PCM 44100 hz>16 bit stereo type.

More particularly, in the present exemplary implementation of the invention, said encoding is done using the following process:

---

Encode_Start (filename, "output.wav", ENCODE_PCM, NULL, > 0); Play (filename, 0); // start the file playing & encoding.

---

Said method according to the present invention may also provide for the further step of subsequent acquisition of one or more additional audio files, in the same container file and in addition to said at least two audio files previously acquired, synchronized and independent.

In a variant of the present exemplary implementation of the method according to the present invention, the same is also implemented by means of:

hardware and software means for acquiring video files, in real time;

hardware and software means for playing video files, and includes the further steps of:

acquiring at least one video file;

synchronizing said at least one video file by means of encoding, obtaining a plurality of video and audio files of the same length, independent from and synchronized with one another;

playing, by means of said means for playing, said synchronized audio files and video files, simultaneously to or independently from one another, according to the instructions present in said parameters file.

In this way, playback of said audio files and said at least one video file synchronized with one another by encoding, is possible simultaneously or independently.

According to a further variant of the method described, the same is also implemented by means of:

image and/or text file storage means with different extension;

hardware and software means for the playback in output of images and/or text with different extension;

and includes the further steps of:

acquiring from said storage means at least one image and/or text file;

synchronizing said at least one image and/or text file by means of encoding, with respect to said synchronized audio files and/or video files;

playing, by means of said means for playing said image and/or said text files, said synchronized audio and/or said video files, simultaneously or independently with respect to one another, according to the instructions present in said parameter file.

In this way, by selectively executing said single container file, it is possible to obtain the simultaneous or independent playback of said audio files, optionally said video file and further files synchronized and acquired from storage means and also present in said container file.

Said files may be text files (such as .TXT, .DOC, .PDF, etc.) and/or image files (such as .JPEG, .PNG, etc.).

This makes the method according to the present invention particularly suitable and versatile with reference to different types of use, for example for didactic purposes, for example by placing the scrolling of an audio file being played side by side with the relative score (for example in .PDF format) and/or the execution of a video, which is also synchronized, relative to the performance of the song itself, said files being included in the same container file and being played back in an entirely independent manner, or synchronized with one another.

Said method according to the present implementation of the invention can further comprise the step of subsequently modifying, individually or simultaneously, one or more of said files comprised in said container file, by means of instructions that are congruent with said parameters file.

Therefore, in addition to the possibility of independent playback of the above files contained in said container file, it is also possible to perform different operations on the same, in an independent manner, depending on the preferences of the user.

Said method according to the present invention is implementable on any platform, through the use of dedicated software means, and requires no special hardware means in addition to what is already commonly available by the use of a common electronic computer.

As is clear from the above, said method for recording a plurality of audio files according to the present invention allows the user to acquire and operate in an independent manner in relation to one or more of said audio files acquired.

Moreover said method, as said, allows the simultaneous display and/or playback of one or more audio and/or video files at the same time as one or more files of different format (for example, a file format .PDF, .TXT or the like).

In addition, for the purposes of the implementation of said method according to the present invention, relatively simple, easily understood hardware and software means are sufficient, implementable respectively, using a common electronic computer.

On the other hand, said method can be implemented as said by means of dedicated software, on any platform.

As it appears from the above description, the present invention allows the objects described in the introduction to be achieved in a simple and advantageous manner.

The invention claimed is:

1. A method for recording a plurality of audio files such that the plurality of audio files can be played individually and, at least in pairs, synchronously and which can be modified individually with respect to playing parameters, said method being implemented by means of electronic processing hardware and software means, including:
    at least two independent devices originating sound signals, comprising storage means or a microphone input or an in line in input;
    means for playing audio files, and
    software means for playing one or more audio files individually or synchronously,
    said method comprising:
    acquiring at least two independent audio files in real time and simultaneously, from at least two sound signal sources, and
    synchronizing the at least two independent audio files by means of an encoder that encodes said at least two independent audio files and making said at least two independent audio files have a same time duration to obtain at least two audio files of the same length and independent from one another,
    including said at least two audio files in a single container file, wherein the single container file is provided with related identification and operating parameters, wherein the single container file is configured such that the at least two audio files can be played independently,
    executing said single container file to play said at least two audio files, with said means for playing said synchronized audio files, wherein said at last two audio files are played simultaneously or independently with respect to one another, according to the instructions present in said single container file provided with said operating parameters.

2. The method according to claim 1, wherein acquiring at least two independent audio filed includes acquiring at least two analog signals by means of a microphone input or an in line input, wherein said analog signals are converted into digital signals by means of encoding of PCM>44100 hz 16 bit stereo type, obtaining respective files in a .WAV format.

3. The method according to claim 1, wherein synchronization of one of said at least two audio files is performed by means of encoding of PCM 44100 hz>16 bit stereo type.

4. The method according to claim 3, wherein said encoding is performed by starting to play the at least two audio files and encoding the at least two audio files into output files.

5. The method according to claim 1, c further comprising a step of subsequently acquiring one or more further audio files, wherein the one or more further audio files are synchronized and independent.

6. The method according to claim 1, also implemented by means of:
    hardware and software means for acquiring video files, in real time;
    hardware and software means for playing video files,
    the method further comprising:
    acquiring at least one video file;
    synchronizing said at least one video file by means of encoding to obtain a plurality of video and audio files of the same length, independent from and synchronized with one another;
    playing, by means of said means for playing, said synchronized audio files and video files, simultaneously to or independently from one another, according to the instructions present in said operating parameters.

7. The method according to claim 1, also implemented by means of:
    hardware and software means including storage means in which image and/or text files with different extension are stored;
    output means for playing images and/or texts with different extension,
    the method further comprising:
    acquiring from said storage means at least one image and/or text file;
    synchronizing said at least one image and/or text file by means of encoding, with respect to said synchronized audio files and/or video files;
    playing, by means of said means for playing said image and/or said text files, said synchronized audio and/or said video files, simultaneously or independently with respect to one another, according to the instructions present in said operating parameters.

8. The method according to claim 1, the method further comprising a step of subsequently modifying, individually or simultaneously, one or more of said files comprised in said single container file, by means of instructions present in said operating parameters.

9. The method according to claim 1, wherein said encoding is performed by sampling.

10. A method for recording a plurality of audio files such that the plurality of audio files can be played individually and, at least in pairs, synchronously and which can be modified individually with respect to playing parameters, said method being implemented by electronic processing hardware and software, including:
    at least two independent devices originating sound signals, comprising storage or a microphone input or an in line in input;
    an audio file player, and
    software for playing one or more audio files individually or synchronously,
    the method comprising:
    acquiring at least two independent audio files in real time and simultaneously, from at least two sound signal sources, and
    synchronizing the at least two independent audio files with one another by an encoder that encodes said at least two independent audio files and making them of a same time duration to obtain at least two audio files of the same length and independent from one another,
    including said at least two audio files in a single container file and providing said single container file, with related identification and operating parameters, wherein the single container file is configured such that the at least two audio files can be played independently, and executing said single container file to play said at least two audio files by said audio file player, wherein said at least two audio files are played simultaneously or independently with respect to one another, according to the instructions present in said single container file provided with operating parameters.

* * * * *